United States Patent [19]
Cook

[11] Patent Number: 6,020,994
[45] Date of Patent: Feb. 1, 2000

[54] INTEGRATED MULTIFUNCTIONAL MULTISPECTRAL SIGHT ASSEMBLY AND METHOD

[75] Inventor: Lacy G. Cook, El Segundo, Calif.

[73] Assignee: Raytheon Company, Lexington, Mass.

[21] Appl. No.: 09/159,011

[22] Filed: Sep. 23, 1998

[51] Int. Cl.[7] .......................... G02B 17/00; G02B 21/00; G02B 23/00
[52] U.S. Cl. .......................... 359/365; 359/350; 359/432
[58] Field of Search .......................... 359/351, 353, 359/364, 365, 400, 403, 419, 350, 432, 726

[56] References Cited

U.S. PATENT DOCUMENTS

| | | | |
|---|---|---|---|
| 5,009,494 | 4/1991 | Iossi | 350/620 |
| 5,047,638 | 9/1991 | Cameron | 250/330 |
| 5,363,235 | 11/1994 | Kiunke | 359/365 |
| 5,517,297 | 5/1996 | Stenton | 356/4.01 |
| 5,831,762 | 11/1998 | Baker | 359/353 |

*Primary Examiner*—Cassandra Spyrou
*Assistant Examiner*—Leo Boutsikaris
*Attorney, Agent, or Firm*—Colin M. Raufer; Leonard A. Alkov; Glenn H. Lenzen, Jr.

[57] ABSTRACT

A system and a method of designing and mechanical packaging of a fully integrated multifunctional multispectral miniaturized sight assembly to allow its use on hand-held man-portable units. All the subsystems of the compact sight assembly, namely, a direct view day subsystem, a CCD-based visible TV subsystem, a staring IR night subsystem, an eyesafe laser rangefinding subsystem and a display subsystem for viewing the output of the TV or IR subsystem, are aligned and use a single telescope and eyepiece in order to decrease the size of the assembly. In addition, each sight assembly subsystem operates in a first and a second field of view, preferably in a narrow field of view and a wide field of view, with wavelengths from 0.45 μm to 12 μm, thereby creating a very small but highly powerful sight assembly.

19 Claims, 3 Drawing Sheets

INTEGRATED MULTIFUNCTIONAL MULTISPECTRAL SIGHT ASSEMBLY AND METHOD

CROSS REFERENCE TO RELATED APPLICATION

A presently preferred embodiment is described and claimed in my commonly assigned application Ser. No. 08/927,254 (Attorney Ref. PD-960436), which is hereby incorporated by reference.

FIELD OF THE INVENTION

The present invention relates generally to the field of multifunctional sight assemblies. In particular, this invention relates to a compact, fully integrated, multifunctional, multispectral sight assembly, which provides a narrow and a wide field of view in each of its subsystems.

BRIEF DESCRIPTION OF THE PRIOR ART

Conventional sight assemblies, either for personnel use or mountable on a vehicle, consist of only one or at the most two subsystems, and are limited to at the most two functions and wavelengths. For example, a traditional rifle sight assembly has a direct view day sight with a single field of view, some have only IR capability with two fields of view, others have a direct view day sight and a laser rangefinder with a single field of view but no IR capability, still others have a multiple field of view IR and a laser rangefinder, but no TV or direct view day sight.

Therefore, the user of conventional devices is required to carry several separate sight units, each having its own optical systems, which creates many inconveniences, additional weight and cost. In addition, the user has to somehow combine the information provided by each of the units, because none of the units give the user the full multispectral, multifunctional capability.

SUMMARY OF THE INVENTION

The present invention generally relates to a system and a method of designing and mechanical packaging of a fully integrated multifunctional multispectral miniaturized sight assembly to allow its use on hand-held man-portable units. All the subsystems of the compact sight assembly are aligned with respect to a common optical axis and use a single telescope and eyepiece in order to decrease the size of the assembly. In addition, each sight assembly subsystem operates in at least two fields of view, preferably in a narrow field of view and a wide field of view, with wavelengths preferably as short as 0.45 µm (short visibility) to as long as 12 µm (long infrared), thereby creating a very small but highly powerful sight assembly.

One specific embodiment of the present invention is a compact fully integrated multifunctional multispectral sight assembly, usable on hand-held man-portable units, having a single reflective afocal foreoptics unit for receiving and transmitting signals, a single eyepiece, a single window, and a plurality of subsystems, aligned with the reflective afocal foreoptics unit, each the subsystem operating in a first and a second field of view and using the window and eyepiece, thereby increasing the efficiency and decreasing the size of the sight assembly. The first field of view is a narrow field of view and the second field of view is a wide field of view. The assembly has a switching means, formed as a folded switching mirror and a periscope, for bypassing the reflective afocal foreoptics when the subsystems are operating in the wide field of view. The subsystems are a direct view day sight subsystem, a CCD-based visible TV subsystem, a staring IR night subsystem, a laser rangefinding subsystem and a display subsystem to view the output from the TV or IR subsystem. The sight assembly is a multispectral system working with wavelengths from 0.45 µm to 12 µm. The reflective afocal foreoptics is an off-axis afocal anastigmat telescope using three mirrors.

Another aspect of the present invention is a method of packaging of a compact fully integrated multifunctional multispectral sight assembly, usable on hand-held man-portable units. The method of the present invention simplifies the design of a sight assembly and eliminates need for separate telescopes, eyepieces, windows, other optical elements and cooling system, thereby providing a sight assembly with excellent sight assembly efficiency. In one specific embodiment, the method has the steps of mounting a single reflective afocal foreoptics unit for receiving and transmitting signals, a single eyepiece, a single window, and a plurality of subsystems, aligned with the reflective afocal foreoptics unit, such that each subsystem operates in the same first and second fields of view and uses the same telescope, window and eyepiece, thereby increasing the efficiency and decreasing the size of the sight assembly.

The foregoing and additional features and advantages of this invention will become further apparent from the detailed description and accompanying drawing figures that follow. In the figures and written description, numerals indicate the various features of the invention, like numerals referring to like features, throughout for the drawing figures and the written description.

DETAILED DESCRIPTION OF THE INVENTION

The present invention relates to the design and packaging of optical elements to provide a compact, fully integrated, multifunctional, multispectral sight assembly, suitable for many commercial and military applications. Sight assembly components are well known in the art and do not need to be described here or be shown in detail.

Figure 1:
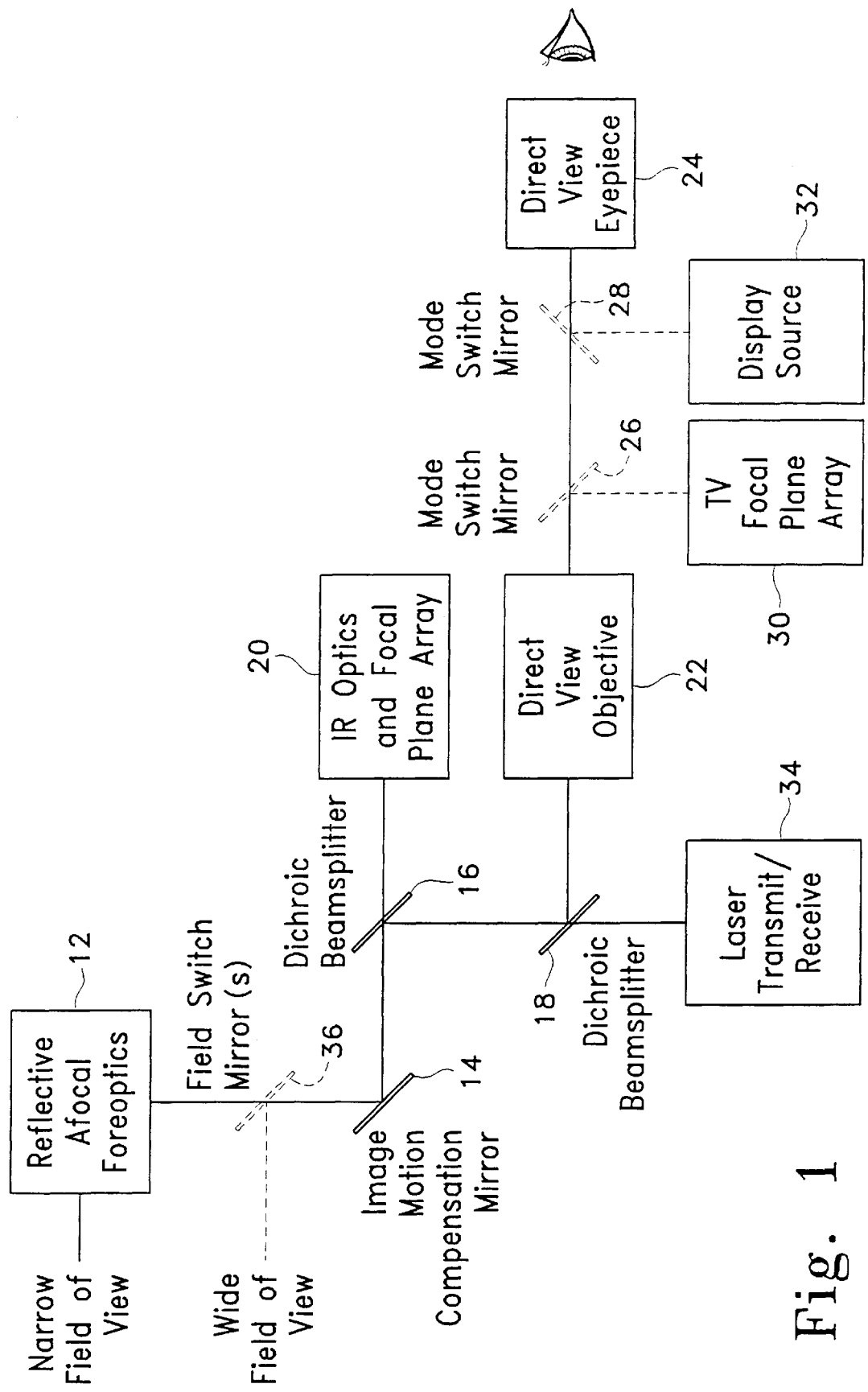
FIG. 1 is a schematic block diagram showing a sight assembly of the present invention.

In particular, a specific embodiment of the present invention is a compact fully integrated sight assembly, designed using the method of the present invention. FIG. 1 is a block diagram showing the sight assembly 10 of the present invention. The sight assembly 10 includes a reflective afocal foreoptics 12, an image motion compensation mirror 14 which stabilizes the line of sight from input mechanical disturbances, two dichroic beamsplitters 16, 18, a laser transmit/receive module 34, an IR optics and focal plane array 20, a direct view objective 22 and a direct view eyepiece 24. In addition, there are two mode switch mirrors 26, 28, connected to a TV focal plane array 30, and a display source 32, respectively. The mode switch mirrors 26, 28 are rotatable about a vertical axis to switch modes of the sight assembly between the direct view day sight and the display mode showing TV or IR imagery. The sight assembly 10 can be used in a narrow field of view (NFOV) for identification and tracking operations or in a wide field of view (WFOV) for search and acquisition operations. In the wide field of view, a field switch mirror(s) 36 is used to prevent optical path from passing through the reflective afocal foreoptics 12.

The sight assembly 10 is a multispectral system which works with wavelengths from 0.45 µm to 12 µm. Visible mode can be accomplished either in direct view mode or using color TV spectrum channels, having wavelength between 0.45 µm and 0.7 µm, or in monochrome TV channels with wavelength between 0.6 µm and 0.9 µm, using charge couple device-based (CCD-based) visible TV. Rangefinder mode is accomplished with a laser rangefinder, preferably a Ng:YAG laser, in channels with wavelength between 1.06 µm and 1.54 µm, and is preferably an eyesafe laser rangefinder which operates at wavelength of 1.54 µm. Infra-red (IR) mode can be accomplished within two atmospheric transmission bands in which IR waves are well transmitted, in a midwave IR (MWIR) mode with wavelength between 3 µm and 5 µm, and a longwave IR (LWIR) mode with wavelength between 8 µm and 12 µm.

The present invention facilitates a highly integrated approach in combining the performance in four modes, namely, IR mode, two types of visible mode (a direct view and a CCD-based visible TV mode), and a laser rangefinder mode, by one small package. As is illustrated in FIG. 1, the sight assembly 10 combines the functions of otherwise separate systems. This is accomplished with four sensing subsystems: a direct view day sight subsystem, a CCD-based visible TV subsystem, a staring IR night subsystem, and an eyesafe laser rangefinding subsystem. All four subsystems operate in both the NFOV and WFOV, and the user can switch back and forth between them. The direct view subsystem requires only that the user looks through the eyepiece 24, which forms a magnified and virtual image of the scene image formed by the objective lens 22. Thus, light from the scene is directly viewed by the user. The TV subsystem has a camera lens and a CCD-based detector focal plane array which captures the image. After subsequent electronic processing the user can view the scene through the eyepiece 24 which forms a magnified and virtual image of the display source. The image scene can be seen in the IR channel, using a staring IR focal plane array, which after subsequent electronic processing can be viewed by the user through the eyepiece 24 in a manner similar to the viewing of the CCD-based TV channels.

Figure 2:
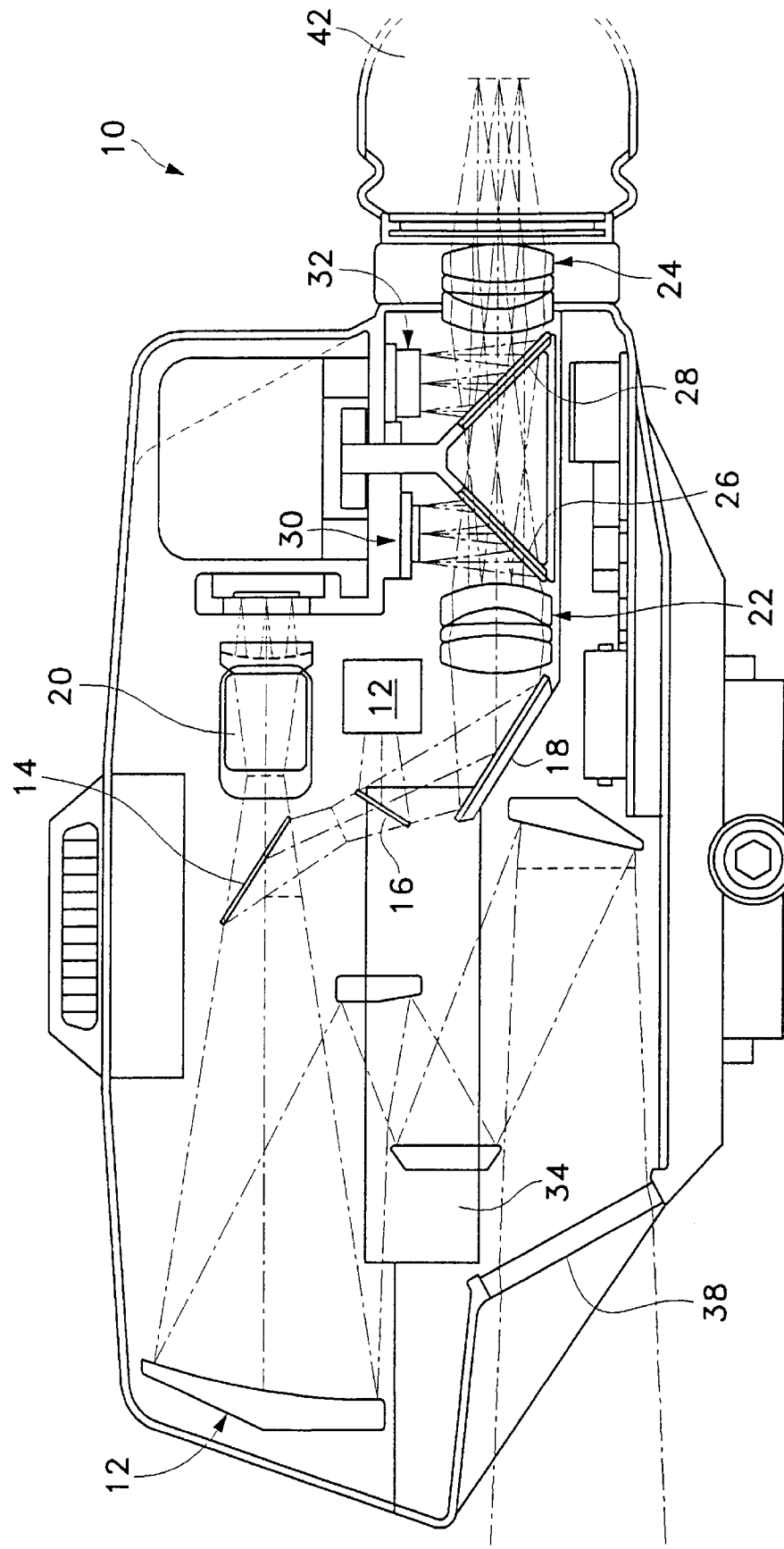
FIG. 2 is a side view of a conceptual layout of the sight assembly presented in FIG. 1.

The reflective afocal foreoptics 12 performs angular magnification of an object seen through the window 38, shown in FIG. 2. The reflective afocal foreoptics 12 is an off-axis 3×afocal magnification three-mirror anastigmat telescope (TMA) which has a narrow field of view that can be as large as 6 degrees in elevation by 8 degrees in azimuth, and a moveable field switching mirror(s) 36. The reflective afocal foreoptics 12 is shared by all subsystems when working in the NFOV, so that no differential boresight shifts can be introduced in the NFOV in the optical path. Within the reflective afocal foreoptics 12 there could also be an alternate field switching periscope mechanism, not shown, composed of two planar field switch mirrors 36 in a periscope arrangement. For WFOV of operation, the field switching mirror(s) 36 is rotated into the optical path to bypass the reflective afocal foreoptics 12 by all the subsystems and the user views the outside world with a wide field of view that is 18 degrees by 24 degrees.

The WFOV is used to search for an object when the user does not need a high level of sensitivity or resolution. When the object is found, the user switches to the NFOV, which provides a higher magnification and sensitivity, provided by the reflective afocal foreoptics 12.

Figure 3:
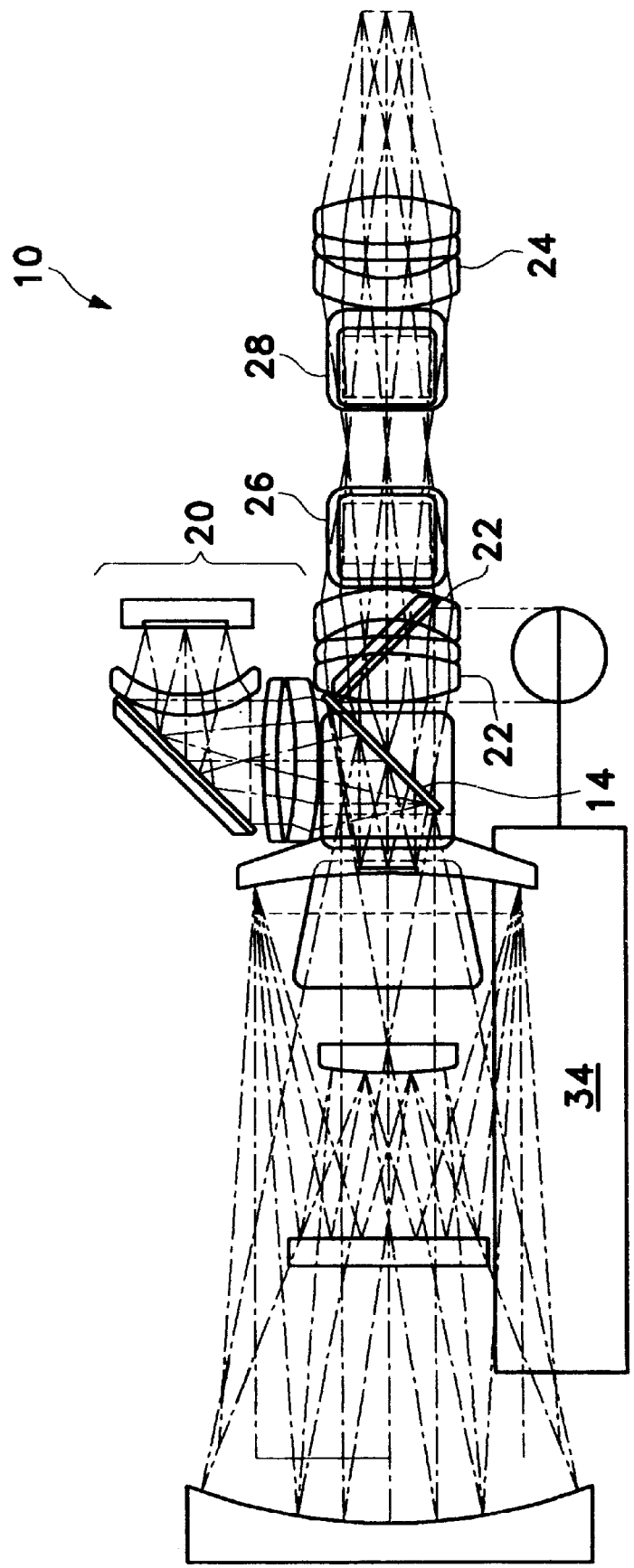
FIG. 3 is a top view of a conceptual layout of the sight assembly presented in FIG. 1.

The laser transmit/receive module 34 of the eyesafe laser rangefinding subsystem and the IR optics and focal plane array 20 of the IR night sight subsystem are split off the optical path at a first dichroic beamsplitter 16 and a second dichroic beamsplitter 18, respectively, working in the collimated region following the reflective afocal foreoptics 12. The first and second dichroic beamsplitters 16, 18 are preferably at 45 degree angle and they can be replaced with flat mirrors. The laser light from the eyesafe laser rangefinding subsystem 34, shown in FIG. 3, leaves and subsequently enters the small laser transmit/receive module 34, where pre-expansion and transmit/receive splitting occurs. The IR radiation enters a three-lens IR imager and is focused onto a staring array, all parts of the IR optics and focal plane array 20, operating at room temperature. The IR imager operates in the WFOV when used by itself, but it operates at the NFOV when used with the reflective afocal foreoptics 12.

The two visible modes, CCD and direct view, are contained within a 1×magnification pupil relay, composed of two identical telecentric eyepieces 42, placed image to image. In the direct view mode, the user views through 1×magnification pupil relay and the reflective afocal foreoptics 12 for the NFOV, and uses just the 1×magnification pupil relay and bypasses the reflective afocal foreoptics 12 for the WFOV through the field switching periscope or through a single mirror mechanism, such as the field switch mirror(s) 36. The mode switch mirror 26 is used to divert the intermediate image in the 1×magnification pupil relay to the CCD-based TV focal plane array 30, while the other mode switch mirror 28 is used to divert the image from the eyepiece 42 to the display source 32, which those skilled in the art will observe can be a CRT, a liquid crystal matrix display (LCMD) or a ferroelectric display, depending on application design detail, used for viewing either the CCD-based TV or IR channel imagery.

Both the TV and the IR channels can employ room temperature staring technology, therefore reducing the complexity, size and weight of the sight assembly 10, because the additional scanning and cryogenic systems are not needed.

In addition, the sight assembly 10 is compact due to the fact that most of the optical modules serve more than one function. For example, the day sight eyepiece 24 is also used to view the display for CCD-based TV or IR imagery, and the reflective afocal foreoptics 12 is used by all subsystems. The day sight objective lens 22 is also the camera lens for the CCD focal plane array 30.

Many conventional IR detection systems previously operated at cold temperatures and had to be cooled by cryocoolers, and if they sensed any stray heat, they would generate internal noise. However, recently developed staring pyroelectric array detectors, can be used at room temperature. Although they are less sensitive, there is a tremendous saving in size, weight and there are fewer moving parts. In addition, conventional sight systems could not be readily adapted to work in the broad spectical bands necessary because they use refractive lenses optimized for a particular waveband.

The method of the present invention allows the miniaturization of the sight assembly 10 elements to obtain a highly efficient fully integrated multispectral multifunctional sight assembly 10, which has dimensions of less than 4"×6"×12". The method of combining all the separate subsystems into one sight assembly 10 reduces the number of parts, thus creating a light weight, small volume sight assembly 10, most desirable in hand-held systems, man-portable or vehicle-mounted systems. In addition, it is conceivable that additional optical elements can be mounted on the sight assembly 10.

The method of the present invention used to miniaturize the sight assembly 10 can be applied to various systems, in commercial and military applications, as free-standing hand-held units, mounted on man-portable weapons like rifles and mounted on vehicles. In addition, the method of the present invention can be used to create a new family of miniaturized, highly integrated, high efficiency multispectral multifunction sensing assemblies which are able to provide all sensing needs in a very small physical volume.

While this invention has been described with reference to its presently preferred embodiment(s), its scope is only limited insofar as defined by the following set of claims and all equivalents thereof.

I claim:

1. A compact fully integrated multifunctional multispectral sight assembly comprising:

a single window;

a single reflective afocal foreoptics unit for receiving and transmitting signals;

a reflective optical field-of-view switch structure controllably movable between a first-field-of-view position that receives and transmits signals through the single reflective afocal foreoptics unit, and a second-field-of-view position that bypasses the single reflective afocal foreoptics unit to receive and transmit signals, both a first field of view and a second field of view being through the single window;

at least two subsystems in controllable optical communication with said reflective optical switch, at least one of the subsystems operating in a visible wavelength range and including an eyepiece, and at least one of the subsystems operating in an infrared wavelength range.

2. The assembly as claimed in claim 1, where said field-of-view switch is a reflective means chosen from the group comprising a folded switching mirror and a periscope.

3. The assembly as claimed in claim 1 wherein the plurality of subsystems comprises a direct view day sight subsystem, a CCD-based visible TV subsystem, a staring IR night subsystem, a laser rangefinding subsystem and a display subsystem to view the output from the TV or IR subsystem.

4. The assembly as claimed in claim 1 wherein the system is a multispectral system working with wavelengths from 0.45 µm to 12 µm, in direct view mode using color TV spectrum channels having wavelength between 0.45 µm and 0.7 µm, in monochrome TV channels with wavelength between 0.6 µm and 0.9 µm using a charge couple device-based (CCD-based) visible TV, in a rangefinder mode in channels with wavelength between 1.06 µm and 1.54 µm, and in infra-red (IR) mode, in a midwave IR (MWIR) mode with wavelength between 3 µm and 5 µm, or a longwave IR (LWIR) mode with wavelength between 8 µm and 12 µm.

5. The assembly as claimed in claim 4 wherein the laser rangefinding subsystem operates at an eyesafe infrared wave length of 1.54 µm.

6. The assembly as claimed in claim 1 wherein the reflective afocal foreoptics is an off-axis afocal anastigmat telescope comprising at least three mirrors.

7. A method of packaging of a compact fully integrated multifunctional multispectral sight assembly, usable on hand-held man-portable units, comprising the following steps:

mounting a single reflective afocal foreoptics unit for receiving and transmitting signals including a single eyepiece and a single window;

mounting a plurality of subsystems aligned with said reflective afocal foreoptics unit, each said subsystem operating in a first and a second field of view and said window.

8. The method as claimed in claim 7 wherein said first field of view is narrower than said second field of view, said method further comprising the step of mounting a switching means for bypassing the reflective afocal foreoptics when the subsystems are operating in the second field of view.

9. The method as claimed in claim 8 wherein said switching means for bypassing the reflective afocal foreoptics when the subsystems are operating in the second field of view is a reflective means chosen from the group comprising a folded switching mirror and a periscope.

10. The method as claimed in claim 7 wherein the plurality of subsystems comprises a direct view day sight subsystem, a CCD-based visible TV subsystem, a staring IR night subsystem, a laser rangefinding subsystem and a display subsystem to view the output from the TV or IR subsystem.

11. The method as claimed in claim 7 wherein the sight system is a multispectral system working with wavelengths from 0.45 µm to 12 µm, in direct view mode using color TV spectrum channels having wavelength between 0.45 µm and 0.7 µm, in monochrome TV channels with wavelength between 0.6 µm and 0.9 µm using a charge couple device-based (CCD-based) visible TV, in a rangefinder mode in channels with wavelength between 1.06 µm and 1.54 µm, and in infra-red (IR) mode, in a midwave IR (MWIR) mode with wavelength between 3 µm and 5 µm, or a longwave IR (LWIR) mode with wavelength between 8 µm and 12 µm.

12. The method as claimed in claim 11 wherein the laser rangefinding subsystem operates at an eyesafe infrared wavelength of 1.54 µm.

13. The method as claimed in claim 7 wherein the reflective afocal foreoptics is an off-axis afocal anastigmat telescope comprising at least three mirrors.

14. A compact fully integrated multifunctional multispectral sight assembly, comprising:

a window;

a single reflective afocal foreoptics unit which spatially magnifies an image passing therethrough;

a reflective optical field-of-view switch structure which is in optical communication with the single reflective afocal foreoptics unit and is controllably movable between a first field-of-view position that receives and transmits signals through the single reflective afocal foreoptics unit, and a second-field-of-view position that bypasses the single reflective afocal foreoptics unit to receive and transmit signals, both a first field of view and a second field of view being through the window;

at least two subsystems, each of which is controllably placed in optical communication with the field-of-view switch structure so that each subsystem is operable in both the first field of view and the second field of view, at least one of the subsystems operating in a visible wavelength range and at least one of the subsystems operating in an infrared wavelength range.

15. The assembly of claim 14, wherein one of the fields of view is a narrow field of view, and the other of the fields of view is a wide field of view.

16. The assembly of claim 14, wherein the at least one subsystem operating in the visible-wavelength range includes at least one of the group consisting of a television sensor and a direct-viewing eyepiece.

17. The assembly of claim 14, wherein the at least one subsystem operating in the infrared wavelength range includes an infrared sensor and a laser transmitter/receiver.

18. The assembly of claim 14, wherein the at least two subsystems include a visible-wavelength television sensor, a direct-viewing eyepiece, an infrared sensor, and a laser transmitter/receiver.

19. The assembly of claim 14, wherein the assembly fits within an envelope having dimensions of less than 4 inches by 6 inches by 12 inches.

* * * * *

UNITED STATES PATENT AND TRADEMARK OFFICE
CERTIFICATE OF CORRECTION

PATENT NO. : 6,020,994  
DATED : February 1, 2000  
INVENTOR(S) : Lacy G. Cook

Page 1 of 1

It is certified that error appears in the above-identified patent and that said Letters Patent is hereby corrected as shown below:

Drawings,
Sheet 2 of 3, in Fig. 2, please delete the numbers "12" and "16" respectively; and please delete the number "14", and insert therefor -- 16 --; and please delete the number "18" and insert therefor -- 14 --; and please insert -- 36 -- and a broken line to indicate the field switching mirror; and please insert the number -- 18 -- to indicate the second dichroic beamsplitter; and at the number "20", please change the callout line to indicate the second dichroic beamsplitter "18" and the focal plane array "30";
Sheet 3 of 3, in Fig. 3, please delete the number "14", and insert therefor -- 18 --; and please delete the second occurrence of the number "22"; and please insert the number -- 12 -- on the left side of the drawing to indicate the reflective afocal foreoptics;

Signed and Sealed this

Ninth Day of April, 2002

*Attest:*

*Attesting Officer*

JAMES E. ROGAN  
*Director of the United States Patent and Trademark Office*